(12) United States Patent
Blasie et al.

(10) Patent No.: US 12,468,110 B2
(45) Date of Patent: Nov. 11, 2025

(54) BREAKOUT THAT IS CONFIGURED TO BE TOOL-LESSLY COUPLED WITH A MULTI-FIBER CABLE

(71) Applicant: PPC BROADBAND, INC., East Syracuse, NY (US)

(72) Inventors: Anthony Blasie, Rochester, NY (US); Nicholas V. Claver, Liverpool, NY (US); Peter A. Carapella, Fayetteville, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 315 days.

(21) Appl. No.: 18/092,889

(22) Filed: Jan. 3, 2023

(65) Prior Publication Data

US 2023/0213722 A1 Jul. 6, 2023

Related U.S. Application Data

(60) Provisional application No. 63/295,605, filed on Dec. 31, 2021.

(51) Int. Cl.
*G02B 6/44* (2006.01)

(52) U.S. Cl.
CPC .................. *G02B 6/4472* (2013.01)

(58) Field of Classification Search
None
See application file for complete search history.

(56) References Cited

U.S. PATENT DOCUMENTS

| 2006/0088250 A1* | 4/2006 | Pimpinella ......... G02B 6/44715 385/53 |
| 2012/0051710 A1* | 3/2012 | Zeng ................... G02B 6/4472 385/137 |
| 2021/0396945 A1* | 12/2021 | de León ............... G02B 6/4472 |

FOREIGN PATENT DOCUMENTS

KR          20000047099 A        7/2000

OTHER PUBLICATIONS

International Search Report and Written Opinion dated Apr. 26, 2023 in corresponding International Application No. PCT/US2023/010065, 12 pages.

* cited by examiner

*Primary Examiner* — Jerry Rahll
(74) *Attorney, Agent, or Firm* — MH2 TECHNOLOGY LAW GROUP LLP

(57) ABSTRACT

A multi-fiber breakout assembly may include a breakout body portion that may be configured to break out a plurality of fiber cables from a multi-fiber cable, a body portion that may include a body-to-coupler engaging portion and a radially inward body-to-cable engaging portion that may be configured to engage an outwardly facing cable portion of a cable, and a coupler portion that may include a coupler-to-body engaging portion that may be configured to engage the body-to-coupler engaging portion of the body portion when the connector assembly is terminated on a cable. The coupler portion may be configured to move from a first position, where the coupler portion does not urge the radially inward body-to-cable engaging portion radially inward onto the outwardly facing cable portion of the multi-fiber cable, to a second position, where the coupler portion urges the radially body-to-cable engaging portion radially inward onto the outwardly facing cable portion of the cable so as to form a body-to-cable engagement portion when the coupler portion (Continued)

is in the second position. The body portion may include a breakout proximate body end portion that is located proximate to the breakout body portion when the coupler portion is in the second position. The coupler portion may be configured to tool-lessly provide a mechanical connector assembly-to-cable connection that may be configured to allow the connector to be connected to the cable without having to use a tool.

26 Claims, 11 Drawing Sheets

BREAKOUT THAT IS CONFIGURED TO BE TOOL-LESSLY COUPLED WITH A MULTI-FIBER CABLE

CROSS-REFERENCE TO RELATED APPLICATION

This application claims the benefit of U.S. Provisional Application No. 63/295,605, filed Dec. 31, 2021, which is currently pending, the disclosure of which is hereby incorporated by reference herein in its entirety.

TECHNICAL FIELD

The present disclosure relates generally to a fiber breakout for use in fiber optic networking applications and, more particularly, to fiber breakout that is configured to the tool-lessly coupled with a multi-fiber cable.

BACKGROUND

Optical fiber systems, including fiber optic cable, are increasingly used in a variety of communications applications, including voice, video, and data transmissions, because they offer a high bandwidth for signal transmission, low noise operation, and inherent immunity to electromagnetic interference. Also, because of the relatively small profile of fiber optic cables compared with other data transfer media, a plurality of fiber optic cables are often bundled together in a multi-fiber cable. A multi-fiber cable may include any number of fibers but typically include a number of fibers that is a factor of twelve. For example, a multi-fiber cable may include twelve fiber optic cables, twenty-four fiber optic cables, thirty-six fiber optic cables, etc.

Further, optical fiber systems typically include connections of optical fibers at various points in the network which requires fibers from a same multi-fiber cable to be routed in different directions as needed to provide fibers at desired locations. Consequently, breakouts from the multi-fiber cable may be provided, with one or more of the fiber optic cables in the multi-fiber cable breaking out (or branching out or fanning out) for connection to a particular component in the system/network.

Some conventional breakouts merely include a tube that is heat shrunk over the breakout region. Other conventional breakouts provide mechanical connections between a multi-fiber cable and a breakout body, but require specific tools to assemble, such as pliers, a heat gun, and the like. Further, conventional breakouts are not designed to be particularly compatible with a multi-fiber cable having annular grooves in its outer surface.

It may be desirable to provide a breakout that mechanically couples to the multi-fiber cable without requiring a tool. It may be desirable to provide a breakout that is particularly suited for use with a multi-fiber cable having annular grooves in its outer surface. It may be desirable to provide a breakout that mechanically constrains the multi-fiber cable axially and circumferentially relative to a breakout body.

SUMMARY

According to various embodiments of the disclosure, a breakout assembly may include a breakout body portion configured to break out a plurality of fiber cables from a multi-fiber cable, a cable body portion having a breakout proximate body end portion that is located proximate to the breakout body portion when the breakout assembly is assembled and a cable engaging body end portion that may be configured to engage a multi-fiber cable, a coupler portion configured to be coupled with the cable engaging body end portion of the cable body portion, and a housing configured to be coupled with the breakout body portion and the cable body portion. The housing may include a first housing portion and a second housing portion that may be configured to be coupled with the first housing portion, the housing may be configured to be coupled with the cable body portion such that the cable body portion is prevented from rotating and from moving axially relative to the housing, and the housing may be configured to be coupled with the breakout body portion such that the breakout body portion is prevented from rotating and from moving axially relative to the housing. The cable body portion may be configured to limit a distance that a multi-fiber cable is inserted into the cable engaging body end portion of the cable body portion. The coupler portion may include an annularly extending ridge portion that may be configured to protrude radially inward from an inner surface portion of the cable body portion, the annularly extending ridge portion may be configured to engage an annular groove portion in a multi-fiber cable when the cable body portion is coupled with the coupler portion so as to prevent relative axial movement between the coupler portion and the multi-fiber cable, and the cable engaging body end portion of the cable body portion may include an external threaded portion and a radially compressible portion that extends from the external threaded portion in a direction away from the breakout proximate body end portion of the cable body portion. The coupler portion may include an internal threaded coupler portion and a tapered inner coupler surface that extends from the internal threaded coupler portion in a direction away from the cable body portion, the internal threaded coupler portion of the coupler portion may be configured to be threadedly coupled with the external threaded portion of the cable body portion, and the tapered inner surface of the coupler portion may be configured to urge the radially compressible portion of the cable body portion radially inward when the coupler portion is threadedly coupled with the cable body portion so as radially compress the radially compressible portion onto a multi-fiber cable. The coupler portion may be configured to be tightened to the cable body portion so as to tool-lessly form a mechanical breakout-cable connection that may be configured to allow the breakout assembly to be connected to a multi-fiber cable without having to use a tool.

According to various aspects of the above embodiment, the first housing portion and the second housing portion are configured to be coupled with one another via a snap fit connection.

According to various aspects of any of the above embodiments, the breakout body portion may include a non-circular portion that may be configured to be received by the housing so as prevent relative rotation between the breakout body portion and the housing.

According to various aspects of any of the above embodiments, the cable body portion may include a non-circular portion that may be configured to be received by the housing so as prevent relative rotation between the cable body portion and the housing.

According to various aspects of any of the above embodiments, the cable body portion may include an annular flange that may be configured to extend inwardly to define a stop surface that may be configured to limit the distance that a multi-fiber cable is inserted into the cable engaging body end portion of the body portion.

According to various embodiments of the disclosure, a breakout assembly may include a breakout body portion configured to break out a plurality of fiber cables from a multi-fiber cable, a cable body portion having a breakout proximate body end portion proximate the breakout body portion and a cable engaging body end portion that may be configured to be engage a multi-fiber cable, a coupler portion configured to be coupled with the cable engaging body end portion of the cable body portion, and a housing configured to be coupled with the breakout body portion and the cable body portion. The cable engaging body end portion of the cable body portion may include an external threaded portion and a radially compressible portion that extends from the external threaded portion in a direction away from the breakout proximate body end portion. The coupler portion may include an internal threaded portion and a tapered inner surface extending from the internal threaded portion in a direction away from the cable body portion, and the internal threaded portion of the coupler portion may be configured to be threadedly coupled with the external threaded portion of the cable body portion. The tapered inner surface of the coupler portion may be configured to urge the radially compressible portion of the cable body portion radially inward when the coupler portion is threadedly coupled with the cable body portion so as radially compress the radially compressible portion onto a multi-fiber cable, and the coupler portion may be configured to be tightened to the cable body portion so as to tool-lessly provide a mechanical connection between the breakout and a multi-fiber cable.

According to various aspects of any of the above embodiments, the coupler portion may include an annularly extending ridge portion that may be configured to protrude radially inward from an inner surface portion of the cable body portion, and the annularly extending ridge portion may be configured to engage an annular groove portion in a multi-fiber cable when the cable body portion is coupled with the coupler portion so as to prevent relative axial movement between the coupler portion and the multi-fiber cable.

According to various aspects of any of the above embodiments, the housing may include a first housing portion and a second housing portion that may be configured to be coupled with first housing portion.

According to various aspects of any of the above embodiments, the first housing portion and the second housing portion are configured to be coupled with one another via a snap fit connection.

According to various aspects of any of the above embodiments, the housing may be configured to be coupled with the cable body portion such that the cable body portion is prevented from rotating and from moving axially relative to the housing, and the housing may be configured to be coupled with the breakout body portion such that the breakout body portion is prevented from rotating and from moving axially relative to the housing.

According to various aspects of any of the above embodiments, the cable body portion may be configured to limit a distance that a multi-fiber cable is inserted into the cable engaging body end portion of the cable body portion.

According to various aspects of any of the above embodiments, the cable body portion may include an annular flange portion that may be configured to extend inwardly to define a stop surface that may be configured to limit the distance that a multi-fiber cable is inserted into the cable engaging body end portion of the cable body portion.

According to various aspects of any of the above embodiments, the breakout body portion may include a non-circular portion that may be configured to be received by the housing so as prevent relative rotation between the breakout body portion and the housing, and the cable body portion may include a non-circular portion that may be configured to be received by the housing so as prevent relative rotation between the cable body portion and the housing.

According to various embodiments of the disclosure, a multi-fiber breakout assembly may include a breakout body portion that may be configured to break out a plurality of fiber cables from a multi-fiber cable, a body portion that may include a body-to-coupler engaging portion and a radially inward body-to-cable engaging portion that may be configured to engage an outwardly facing cable portion of a cable, and a coupler portion that may include a coupler-to-body engaging portion that may be configured to engage the body-to-coupler engaging portion of the body portion when the connector assembly is terminated on a cable. The coupler portion may be configured to move from a first position, where the coupler portion does not urge the radially inward body-to-cable engaging portion radially inward onto the outwardly facing cable portion of the multi-fiber cable, to a second position, where the coupler portion urges the radially body-to-cable engaging portion radially inward onto the outwardly facing cable portion of the cable so as to form a body-to-cable engagement portion when the coupler portion is in the second position. The body portion may include a breakout proximate body end portion that is located proximate to the breakout body portion when the coupler portion is in the second position. The coupler portion may be configured to tool-lessly provide a mechanical connector assembly-to-cable connection that may be configured to allow the connector to be connected to the cable without having to use a tool.

According to various aspects of any of the above embodiments, the portion of the cable body portion may comprise a radially compressible portion at the cable engaging body end portion of the cable body portion, and the coupler portion may include an inner surface that tapers in a direction away from the cable body portion.

According to various aspects of any of the above embodiments, the second end of the cable body portion may include an external threaded portion, and the coupler portion may include an internal threaded portion configured to be threadedly coupled with the external threaded portion of the cable body portion.

According to various aspects of any of the above embodiments, the coupler portion may include an annularly extending ridge portion that may be configured to protrude radially inward from an inner surface portion of the cable body portion, and the annularly extending ridge portion may be configured to engage an annular groove portion in a multi-fiber cable when the cable body portion is coupled with the coupler portion so as to prevent relative axial movement between the coupler portion and the multi-fiber cable.

According to various aspects of any of the above embodiments, wherein the assembly may further comprise a housing that may be configured to be coupled with the breakout body portion and the cable body portion.

According to various aspects of any of the above embodiments, the housing may include a first housing portion and a second housing portion configured to be coupled with one another.

According to various aspects of any of the above embodiments, the first housing portion and the second housing portion are configured to be coupled with one another via a snap fit connection.

According to various aspects of any of the above embodiments, the housing may be configured to be coupled with the cable body portion such that the cable body portion is prevented from rotating and from moving axially relative to the housing.

According to various aspects of any of the above embodiments, the housing may be configured to be coupled with the breakout body portion such that the breakout body portion is prevented from rotating and from moving axially relative to the housing.

According to various aspects of any of the above embodiments, the cable body portion may be configured to limit a distance that a multi-fiber cable is inserted into the cable engaging body end portion of the body portion.

According to various aspects of any of the above embodiments, the cable body portion may include an annular flange that may be configured to extend inwardly to define a stop surface that may be configured to limit the distance that a multi-fiber cable is inserted into the cable engaging body end portion of the body portion.

According to various aspects of any of the above embodiments, the breakout body portion may include a non-circular portion that may be configured to be received by the housing so as prevent relative rotation between the breakout body portion and the housing.

According to various aspects of any of the above embodiments, the cable body portion may include a non-circular portion that may be configured to be received by the housing so as prevent relative rotation between the cable body portion and the housing.

Various aspects of breakouts, as well as other embodiments, objects, features, and advantages of this disclosure, will be apparent from the following detailed description of illustrative embodiments thereof, which is to be read in conjunction with the accompanying drawings.

DETAILED DESCRIPTION OF EMBODIMENTS

Figure 1:
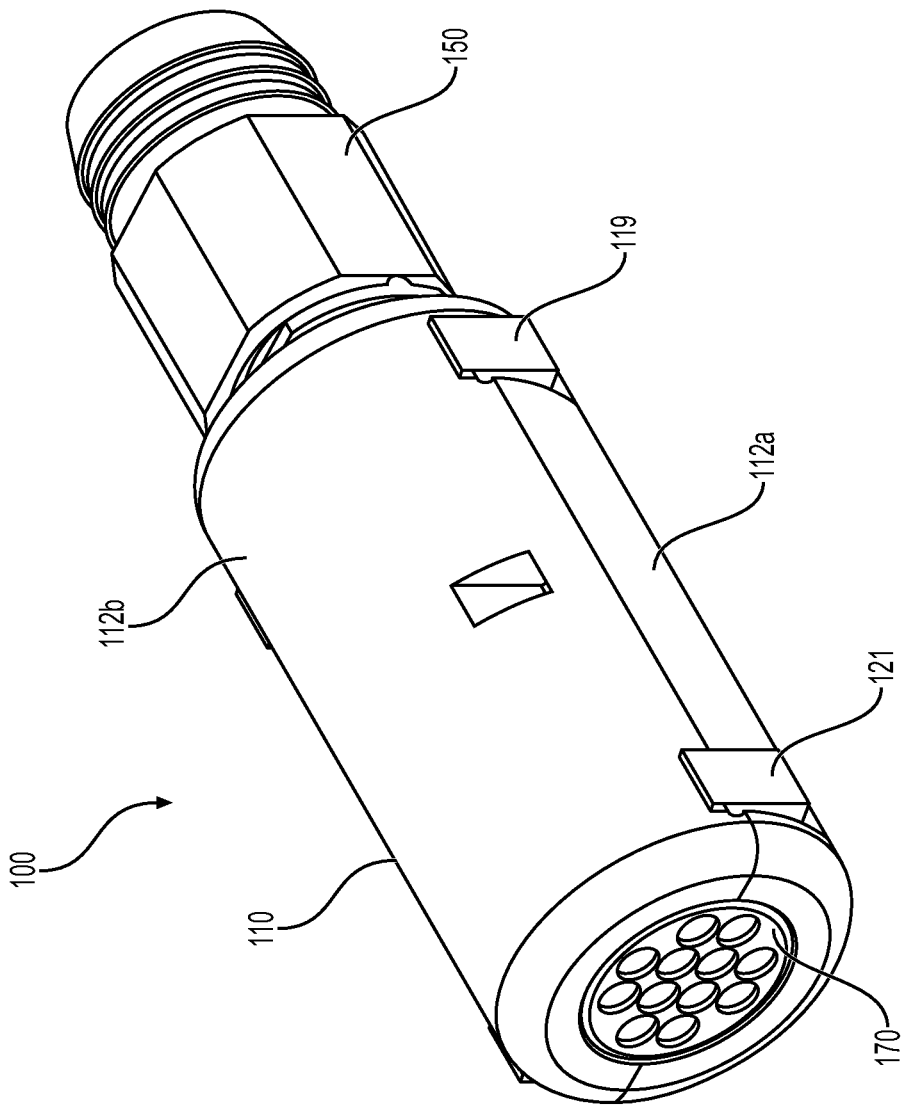
FIG. 1 is a perspective view of an exemplary breakout according to various aspects of the disclosure.
Figure 2:
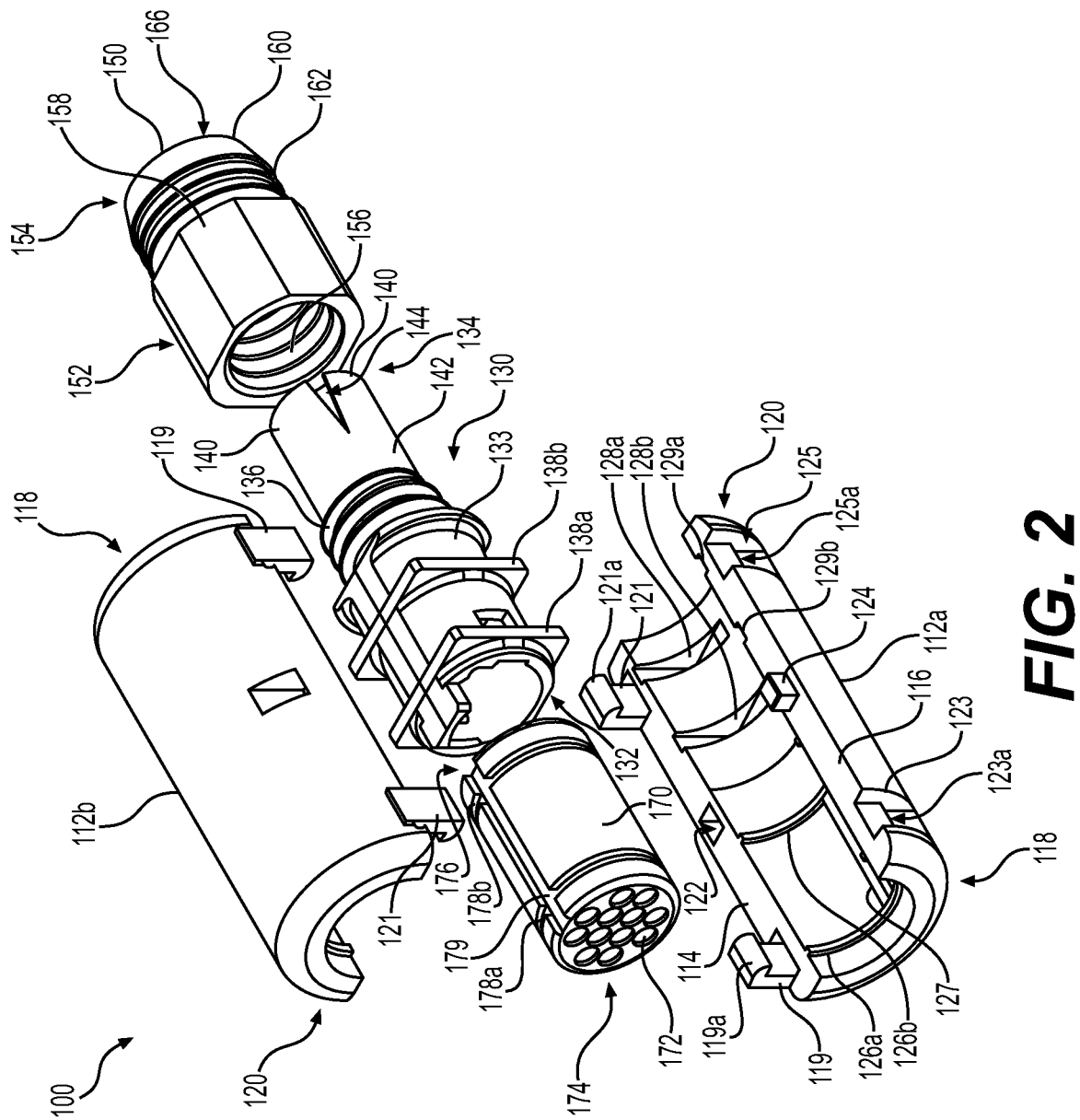
FIG. 2 is an exploded perspective view of the exemplary breakout of FIG. 1.

As a preface to the detailed description, it should be noted that, as used in this specification and the appended claims, the singular forms "a", "an," and "the" include plural referents, unless the context clearly dictates otherwise.

FIGS. 1-4 illustrate an exemplary breakout 100 according to various aspects of the disclosure. The breakout 100 is configured and dimensioned to break out fiber optic cables 192 from a multi-fiber cable 190 containing a plurality of fiber optic cables. As illustrated, the breakout 100 is configured to break out the individual fibers from a multi-fiber cable containing up to twelve fibers. It should be appreciated that the breakout 100 and its components can be scaled in size and configuration to break out the individual fibers from a multi-fiber cable containing more or less than twelve fibers. The breakout 100 can also be scaled to be compatible with various diameters of multi-fiber cable.

The breakout 100 includes a housing 110, a connector body or cable body portion 130, a coupler or coupler portion 150, and a breakout body or breakout body portion 170. The housing 110 includes a first housing portion 112a and a second housing portion 112b. Each housing portion 112a, 112b is semi-cylindrical and extends from a first end surface 114 to a second end surface 116 in a circumferential direction. The first and second end surfaces 114, 116 lie in a same plane. Each housing portion 112a, 112b has a first end 118 and a second end 120 in a longitudinal direction.

A first projection 119 extends from the first end surface 114 proximate the first end 118, and a second projection 121 extends from the first end surface 114 proximate the second end 120. The first end surface 114 includes a cutout 122 between the first and second projections 119, 121 in the longitudinal direction. A free end of the first projection 119 includes a lip 119a that extends toward the second end surface 116, and a free end of the second projection 121 includes a lip 121a that extends toward the second end surface 116.

The second end surface 116 includes a first cutout portion 123 proximate the first end 118 and a second cutout portion 125 proximate the second end 120. The first cutout portion 123 is configured to include a shoulder portion 123a spaced from the second end surface 116, and the second cutout portion 125 is configured to include a shoulder portion 125a spaced from the second end surface 116. A projection 124 extends from the second end surface 116 between the first and second cutout portions 123, 125 in the longitudinal direction.

The housing 110 is formed with the first end surface 114 of the first housing portion 112a facing the second end surface 116 of the second housing portion 112b and the first end surface 114 of the second housing portion 112b facing the second end surface 116 of the first housing portion 112a. In this relative orientation, the first cutout portion 123 of the first housing portion 112a is configured to receive the second projection 121 of the second housing portion 112b such that the lip 121a is overlaps and engages the shoulder portion 123a in a snap fit relationship, as would be understood by persons of ordinary skill in the art. Also, the second cutout portion 125 of the first housing portion 112a is configured to receive the first projection 119 of the second housing portion 112b such that the lip 119a overlaps and engages the shoulder portion 125a in a snap fit relationship. In addition, the cutout 122 of the second housing portion 112b is configured to receive the projection 124 of the first housing portion 112a, for example, due to the cutout 122 and the projection 124 having complementary shapes and sizes.

Similarly, in this relative orientation, the first cutout portion 123 of the second housing portion 112b is configured to receive the second projection 121 of the first housing portion 112a such that the lip 121a is overlaps and engages the shoulder portion 123a in a snap fit relationship, as would be understood by persons of ordinary skill in the art. Also, the second cutout portion 125 of the second housing portion 112b is configured to receive the first projection 119 of the first housing portion 112a such that the lip 119a overlaps and engages the shoulder portion 125a in a snap fit relationship. In addition, the cutout 122 of the first housing portion 112a is configured to receive the projection 124 of the second housing portion 112b, for example, due to the cutout 122 and the projection 124 having complementary shapes and sizes.

The radial inner walls 113 of the first housing portion 112a and the second housing portion 112b include a first ridge or ridge portion 126a and a second ridge or ridge portion 126b extending circumferentially from the first end wall 114 to the second end wall 116. In some aspects, each ridge 126a, 126b may include a plurality of ridge portions spaced apart in the circumferential direction. The first and second ridges 126a, 126b are spaced apart from one another in the longitudinal direction. On the first housing portion 112a, the first and second ridges 126a, 126b are nearer to the first end 118 than to the second end 120, but on the second housing portion 112b, the first and second ridges 126a, 126b are nearer to the second end 120 than to the first end 118. The radial inner walls 113 also include a third ridge or ridge portion 127 extending from the first ridge 126a to the second ridge 126b in the longitudinal direction.

The radial inner walls 113 of the first housing portion 112a and the second housing portion 112b include a first pair of cutouts 128a, 128b, for example, right angle cutouts, extending from the first end surface 114 and a second pair of cutouts 129a, 129b, for example, right angle cutouts, extending from the second end surface 116. The first pair of cutouts 128a, 128b are spaced apart from one another in the longitudinal direction, and the second pair of cutouts 129a, 129b are spaced apart from one another in the longitudinal direction. On the first housing portion 112a, the first and second pairs of cutouts 128a, 128b, 129a, 129b are nearer to the second end 118 than to the first end 120, but on the second housing portion 112b, the first and second pairs of cutouts 128a, 128b, 129a, 129b are nearer to the first end 118 than to the second end 120.

The connector body 130 includes a forward portion 132, a rearward portion 134, an externally threaded portion 136 between the forward and rearward portions 132, 134. The forward portion 132 is configured to be coupled with the housing 110, and the rearward portion 134 is configured to be coupled with the multi-fiber cable 190.

The forward portion 132 includes a generally cylindrical outer surface 133 a pair of square flanges 138a, 138b extending from the outer surface 133. The square flanges 138a, 138b are sized and arranged such that the square flange 138a is configured to be received by the cutouts 128b, 129b of the first and second housing portions 112a, 112b and the square flange 138b is configured to be received by the cutouts 128a, 129a of the first and second housing portions 112a, 112b. The cutouts 128a, 128b, 129a, 129b and the square flanges 138a, 138b cooperate to restrain the connector body 130 from moving rotationally and axially relative to the housing 110.

The rearward portion 134 includes a plurality of fingers 140 that extend from a tubular wall 142 of the rearward portion 134 in a rearward direction away from the threaded portions 136. In the illustrated embodiment, the plurality of fingers 140 are defined by V-shaped cutouts 144 at a rearward end of the rearward portion 134 of the connector body 130. Although the illustrated embodiment includes a rearward portion 134 having three fingers 14, it should be understood that in some embodiments the rearward portion 134 may include two fingers or more than three fingers.

Figure 3:
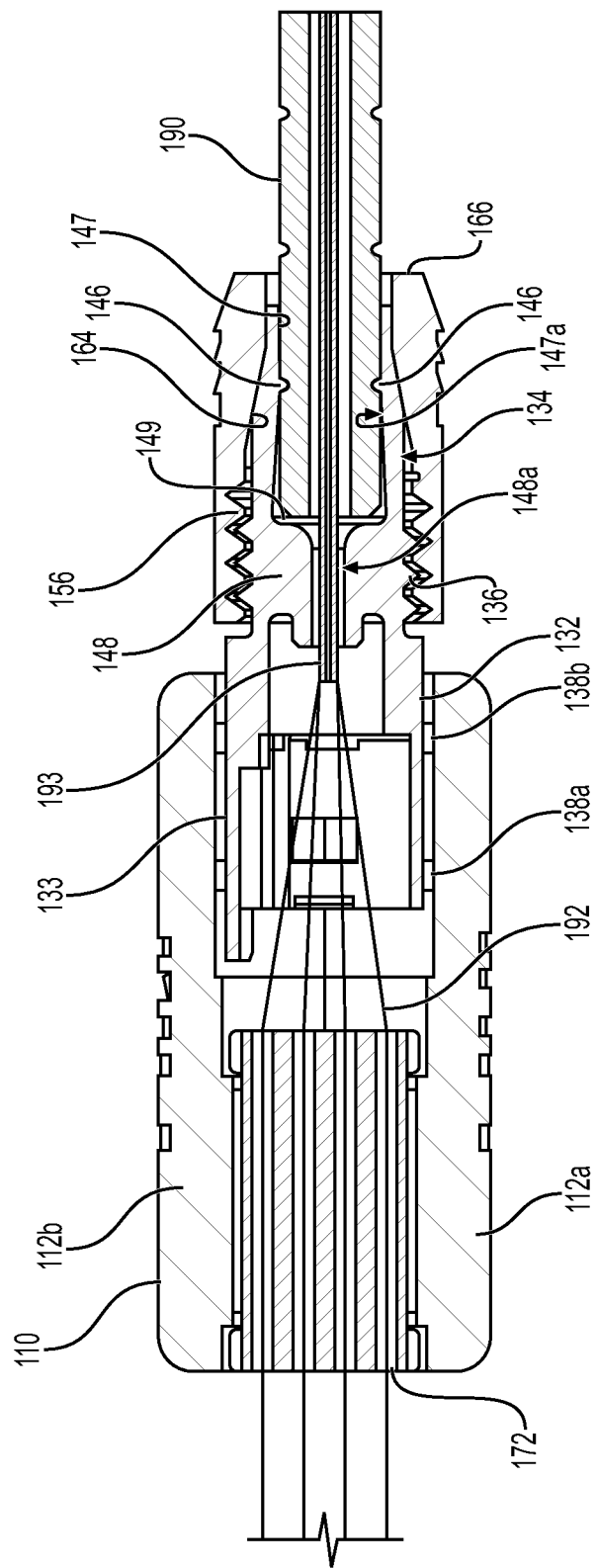
FIG. 3 is a side cross-sectional view of the exemplary breakout of FIG. 1 coupled with a multi-fiber cable.
Figure 4:
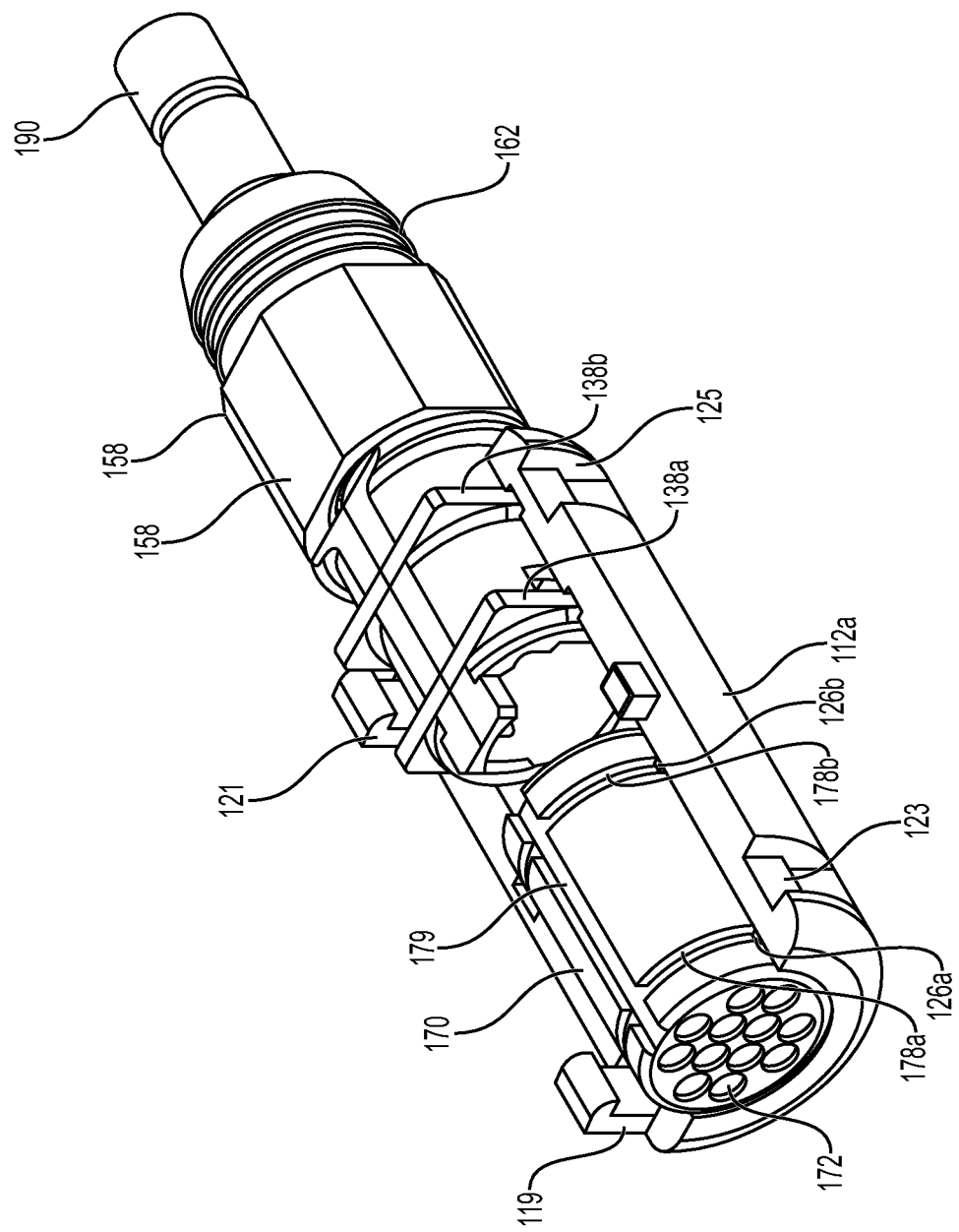
FIG. 4 is a perspective view of the exemplary breakout and multi-fiber cable of FIG. 3 with components removed for clarity.

As shown in FIG. 3, an annularly extending ridge or ridge portion 146 protrudes radially inward from an inner surface 147 of the one or more fingers or finger portions 140. The inner surface 147 defines a first bore 147a having a diameter configured to receive the multi-fiber cable 190. An annular flange 148 extends inward from the inner surface 147 and defines a second bore 148a having a smaller diameter than the first bore 147a. The flange 148 defines a stop surface 149 that limits the distance that the multi-fiber cable 190 can be inserted into the coupler 150 from the rearward portion 134. The second bore 148a is configured to receive a bundle 193 of fibers 192 from the multi-fiber cable 190.

The coupler 150 includes a forward portion 152 and a rearward portion 154. The forward portion 152 includes internal threads 156 and an exterior surface that may be configured with a plurality of linear surfaces 158 to facilitate gripping of the coupler 150 for rotation relative to the connector body 130. The rearward portion 154 may include an outer surface 160 having one or more barbs 162 configured to receive and to help retain a boot (not shown), if desired. The internal threads 156 are sized and arranged to be threadedly coupled with the threaded portion 136 of the connector body 130.

The coupler 150 includes a tapered inside diameter portion 164 that tapers radially inward in a rearward direction from the internal threads 156 toward a rear end 166 of the rearward portion 154. As illustrated, the inner diameter of the coupler 150 at the tapered inside diameter portion 164 and extending from the tapered inside diameter portion 164 to the rear end 166 is less than an outer diameter of the fingers 140, such that the coupler 150 is configured to compress the fingers 140 radially inward when the coupler 150 is threadedly coupled with the threaded portion 136 of the connector body 130.

The breakout body 170 is substantially cylindrical and includes a plurality of through bores 172 extending from a first end 174 to a second end 176 of the breakout body 170. As illustrated, the breakout body 170 includes twelve through bores, each being configured to receive an individual fiber cable 192 broken out from a twelve fiber multi-fiber cable 190. It should be appreciated that the breakout body 170 can include more or less through bores depending on the number of fiber cables in the multi-fiber cable.

The breakout body 170 includes a generally cylindrical outer surface 173, a pair of annular grooves or groove portions 178a, 178b in the outer surface 173, and a pair of axially extending grooves or groove portions 179 at diametrically opposed locations about the circumference of the outer surface 173. The annular grooves 178a, 178b are sized and arranged such that the annular groove 178a is configured to receive the first ridge 126a of the first and second housing portions 112a, 112b, and the annular groove 178b is configured to receive the second ridge 126b of the first and second housing portions 112a, 112b. The axial grooves 179 are sized, arranged, and configured to receive the third ridges 127 of the first and second housing portions 112a, 112*b*. The annular grooves 178*a*, 178*b*, the axial grooves 179, and the first, second, and third ridges 126*a*, 126*b*, 127 cooperate to restrain the breakout body 170 from moving rotationally and axially relative to the housing 110.

In use, the coupler 150 is slid over an end of the multi-fiber cable 190, and the multi-fiber cable 190 is inserted into the first bore 147*a* at the rearward portion 134 of the connector body 120 as far as the stop surface 149 and with the ridge 146 aligned with an annular groove or groove portion 195 in the multi-fiber cable 190. The bundle 193 of fibers 192 extends from the multi-fiber cable 190 and is inserted through the second bore 148*a* and out of the forward portion 132 of the connector body.

At any time after the fibers 192 are fed through the connector body, the coupler 150 can be threadedly coupled with the connector body 130 via threaded portions 136, 156. When the coupler 150 is threadedly coupled with the threaded portion 136 of the connector body 130, the tapered inner surface 164 of the coupler 150 is configured to compress the fingers 140 radially inward to mechanically couple the coupler 150 with the multi-fiber cable 190. The ridge 146 can be urged into the annular groove 195 in the multi-fiber cable 190 to prevent relative axial movement between the coupler 150 and the multi-fiber cable 190.

The individual fibers 192, for example, bare fibers (i.e., a glass fiber filament coated with a strippable coating, e.g., a 250 μm coating), are inserted into and through the through bores 172 of the breakout body 170 and exit the first end 174 of the breakout body 170. The individual fibers 192 exiting the breakout body 170 can be inserted into furcation tubes (not shown) for protection as the fibers are routed to a desired location and terminated for connection to an optical network.

To couple the housing 110 with the connector body 130 and the breakout body, the cutouts 128*b*, 129*b* of the first and second housing portions 112*a*, 112*b* are aligned with the square flange 138*a*, and the cutouts 128*a*, 129*a* of the first and second housing portions 112*a*, 112*b* are aligned with the square flange 138*b*. The first, second and third ridges 126*a*, 126*b*, 127 of the first and second housing portions 112*a*, 112*b* are aligned with the annular grooves 178*a*, 178*b* and axial grooves 179, respectively. The projections 119, 121 of the first housing portion 112*a* are inserted into the cutouts 125, 123 of the second housing portion 112*b*, respectively, until the lips 119*a*, 121*a* snap lock over the respective shoulder portions 125*a*, 123*a*, and the projections 119, 121 of the second housing portion 112*b* are inserted into the cutouts 125, 123 of the first housing portion 112*a*, respectively, until the lips 119*a*, 121*a* snap lock over the respective shoulder portions 125*a*, 123*a*.

Figure 5:
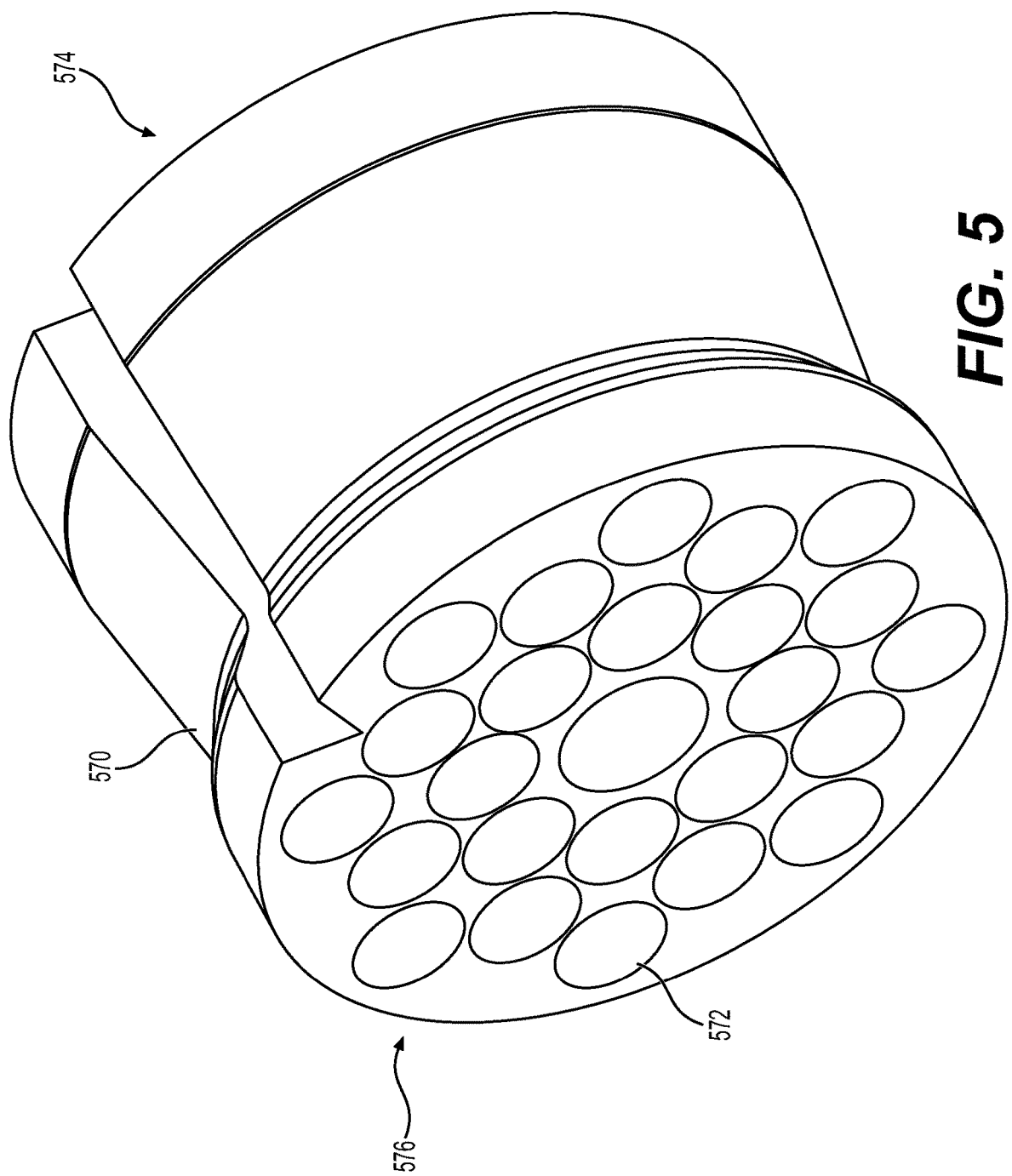
FIG. 5 is a perspective view of another exemplary breakout in accordance with various aspects of the disclosure.
Figure 6:
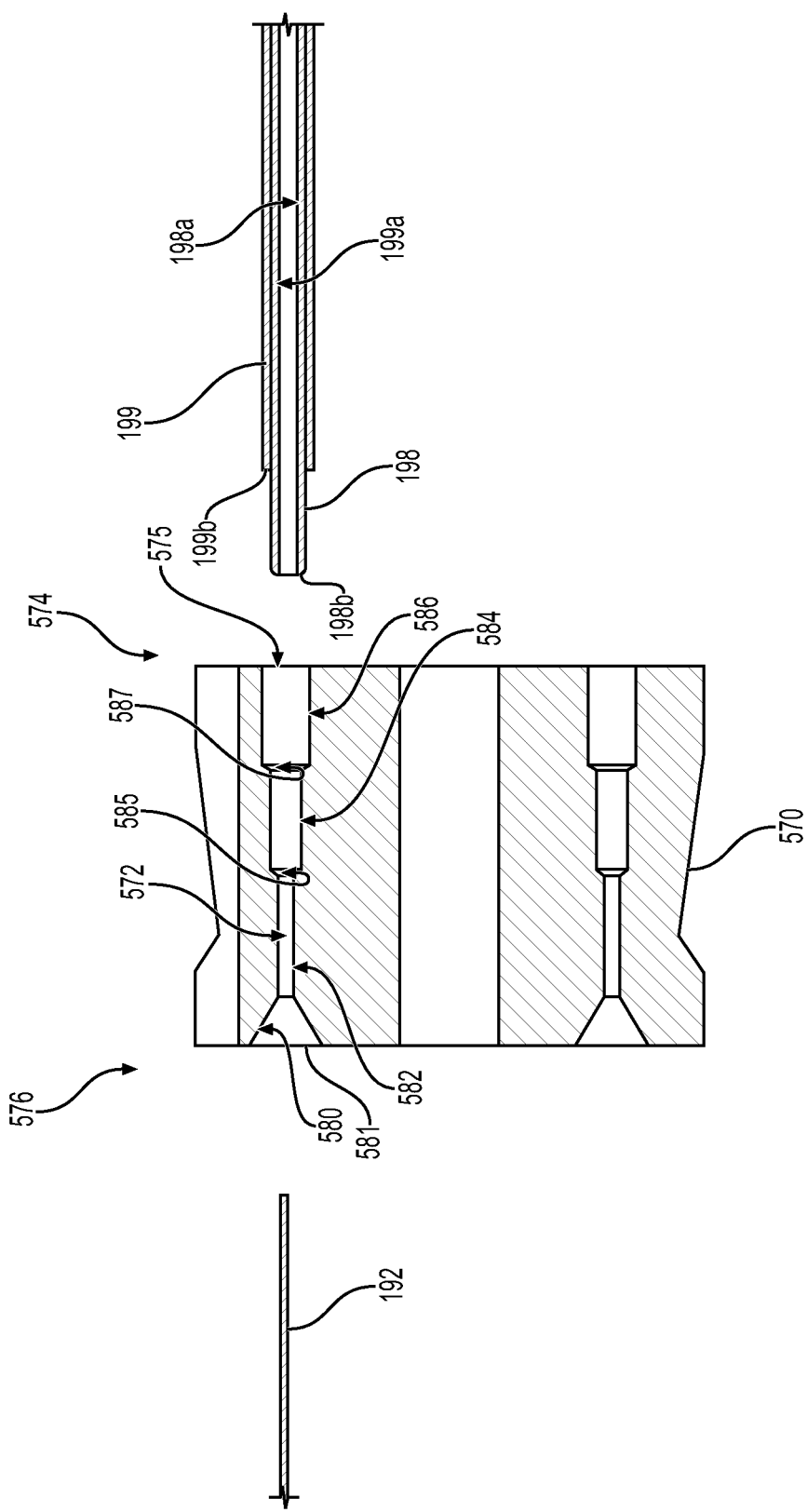
FIG. 6 is a side cross-sectional view of the exemplary breakout of FIG. 5.
Figure 7:
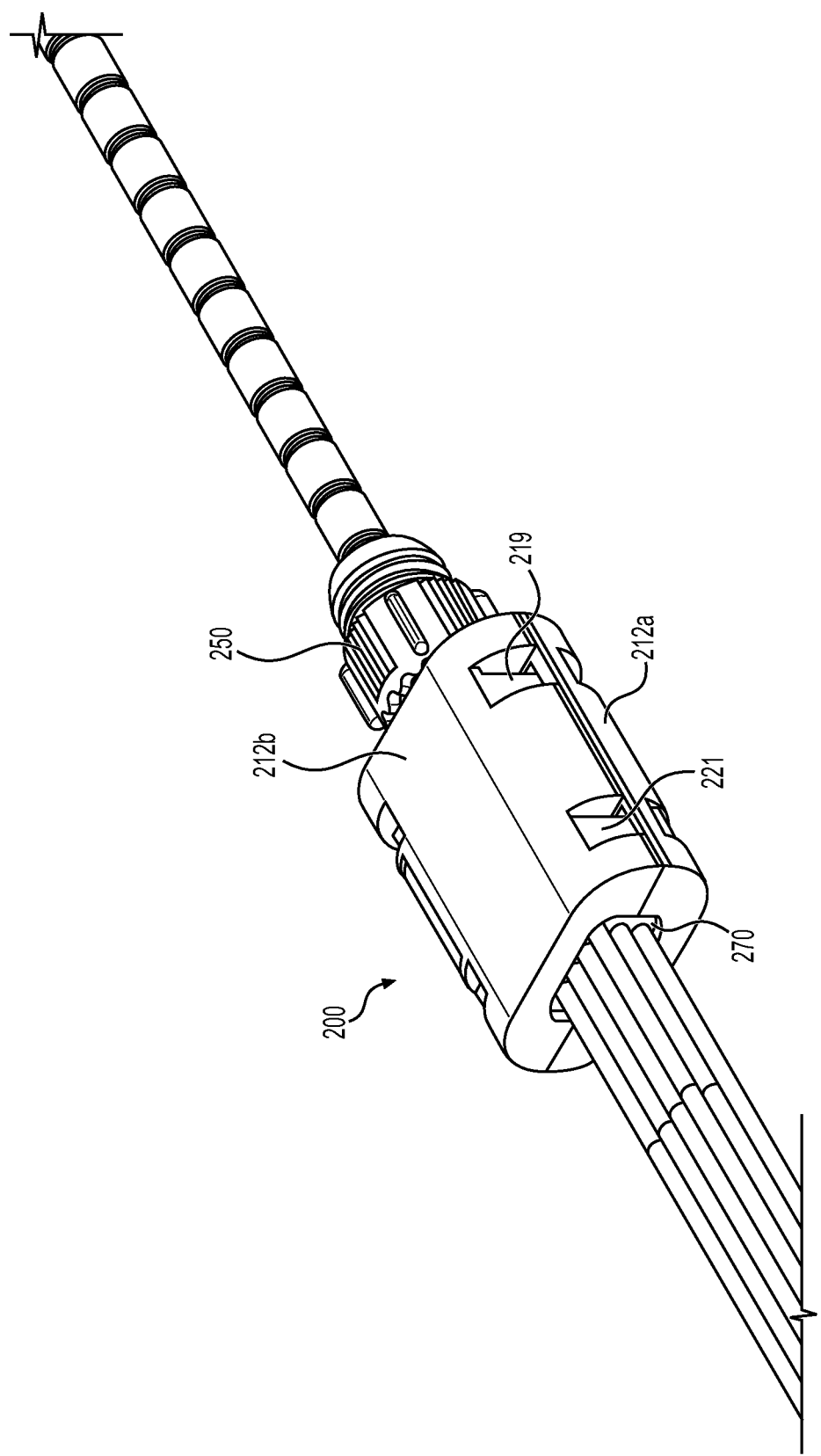
FIG. 7 is a perspective view of an exemplary breakout according to various aspects of the disclosure coupled with a multi-fiber cable.
Figure 8:
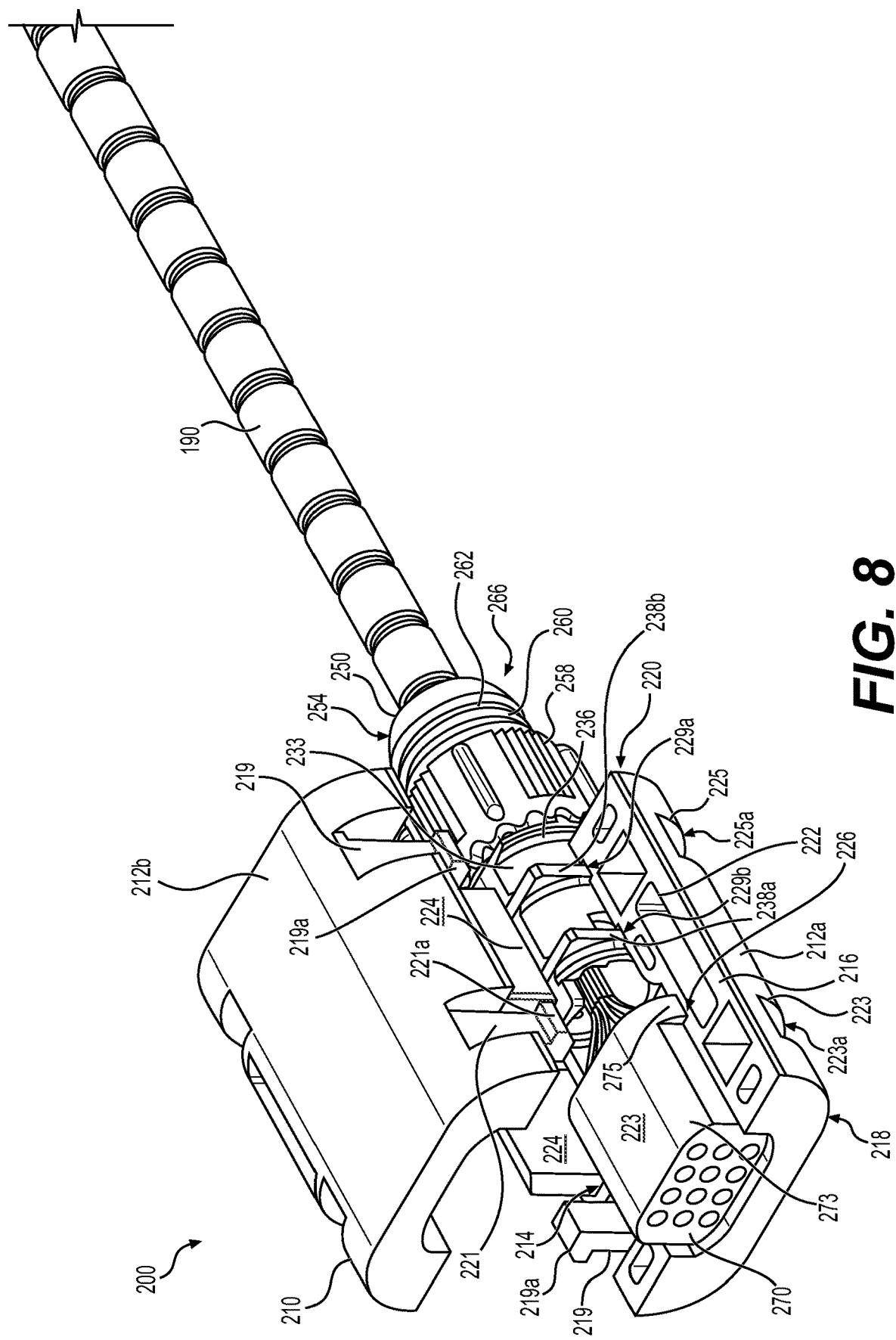
FIG. 8 is a partially exploded perspective view of the exemplary breakout of FIG. 7 coupled with a multi-fiber cable.
Figure 9:
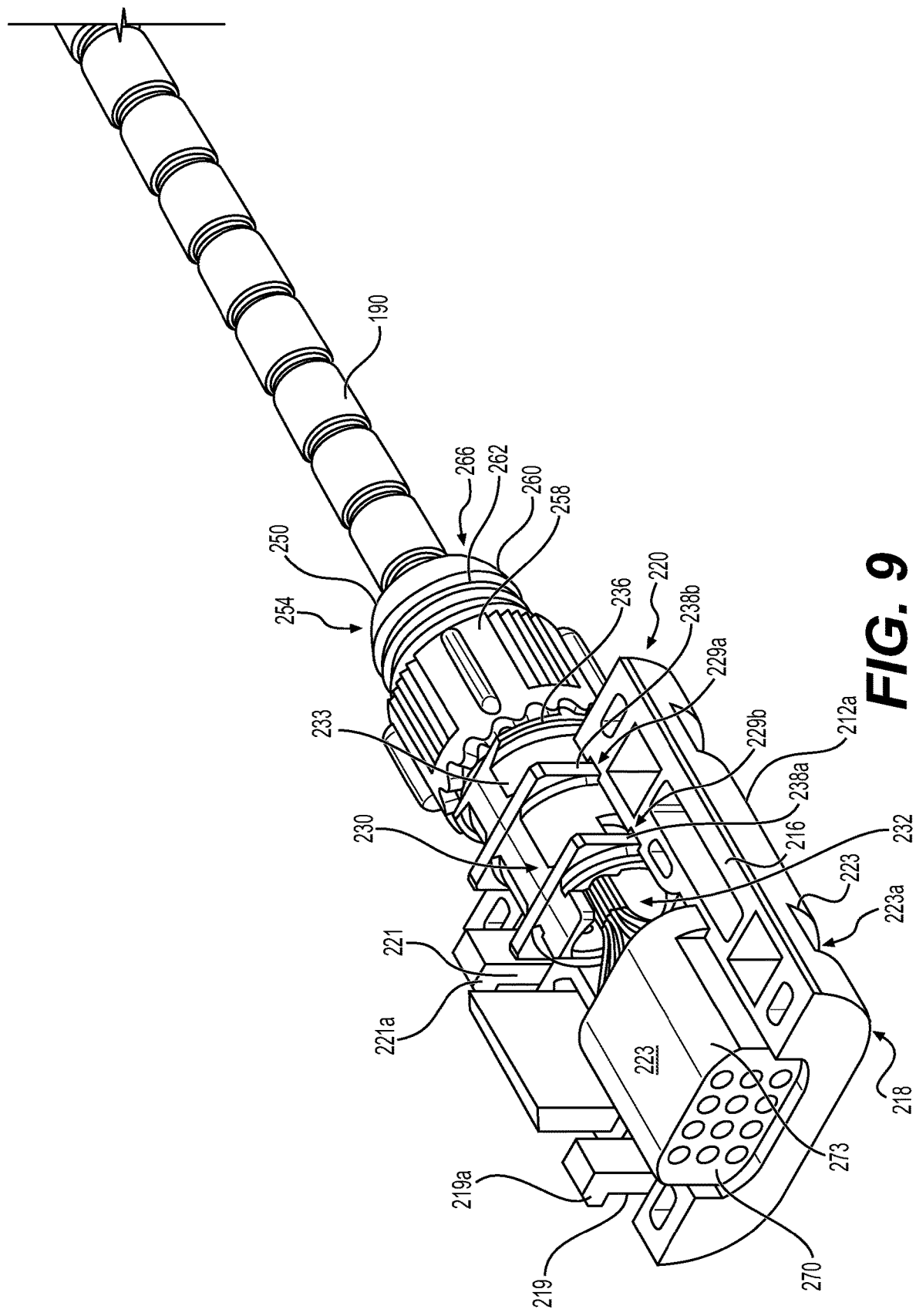
FIG. 9 is a perspective view of a portion of the exemplary breakout of FIG. 7 coupled with a multi-fiber cable.

Referring now to FIGS. 5-6, another exemplary embodiment of a breakout body 570 is illustrated and described. Although the overall size and configuration of the breakout body 570 is different from the breakout body 170 described above, it should be appreciated that the outer structure of the breakout body 570 can be reconfigured to match the breakout body 170 for connection to the housing 110 described above.

The breakout body 570 includes a first end 574, a second end 576, and through bores 572 extending from the first end 574 to the second end 576. The through bores are configured to facilitate alignment of an individual fiber 972 (i.e., a bare fiber) with a buffer tube 198 and/or a furcation tube 199. The buffer tube 198 and/or furcation tube 199 are configured to receive the bare fiber 972 and protect the bare fiber 972 such that it can be routed to a desired location and terminated for connection to an optical network.

As shown in FIG. 6, from the second end 576 to the first end 574, the through bores 572 include a tapered bore portion 580, a first bore portion 582, a second bore portion 584, and a third bore portion 586. The third bore portion 586 includes an inside diameter that is greater than an inside diameter of the second bore portion 584, and the inside diameter of the second bore portion 584 is greater than an inside diameter of the first bore portion 572. The tapered bore portion 580 tapers radially inward from an opening 581 at the second end 576 of the body 570 to first bore portion 582.

The tapered bore portion 580 is configured to receive a guide a bare fiber 972 received via the opening into the first bore portion 582, which inner diameter of the first bore portion 572 is configured to receive the bare fiber 972 and permit the bare fiber 972 to pass from the tapered bore portion 580 to the second bore portion 584.

The third bore portion 586 is configured to receive a furcation tube 199 via an opening 575 at the first end 574 of the connector body. The inner diameter of third bore portion 586 is greater than an outer diameter of the furcation tube 199, but the inner diameter of the second bore portion 584 is smaller than an inner diameter of a bore 199*a* of the furcation tube 199. As such, a stop surface 587 extends from the third bore portion 586 to second bore portion 584 and is configured to engage a leading edge 199*b* of the furcation tube 199.

The second bore portion 584 is configured to receive a buffer tube 198 via an opening 575 at the first end 574 of the connector body. The inner diameter of second bore portion 584 is greater than an outer diameter of the buffer tube 198, but the inner diameter of the first bore portion 582 is smaller than an inner diameter of a bore 198*a* of the buffer tube 198. As such, a stop surface 585 extends from the second bore portion 584 to first bore portion 582 and is configured to engage a leading edge 198*b* of the buffer tube 198.

In use, the buffer tube 198 and the furcation tube 199, which surrounds the buffer tube 198, are inserted into the opening 575 at the first end 574 of the breakout body 550. The buffer tube 198 and the furcation tube 199 are inserted into the third bore portion 586 and second bore portion 584, respectively, until the leading edge 198*b* of the buffer tube 198 engages or is proximate the stop surface 585 and/or the leading edge 199*b* of the furcation tube 199 engages or is proximate the stop surface 587.

The bare fiber 192 is inserted into the through bore 572 via the opening at the second end 576 of the connector body 550. The tapered bore portion 580 guides the bare fiber 192 into the first bore portion 582, which guides the bare fiber 192 into the buffer tube 198 in the second bore portion 584. Because the inner diameter of the first bore portion 582 is smaller than an inner diameter of a bore 198*a* of the buffer tube 198, the bare fiber 192 is guided into the buffer tube 198 without fear of engaging the leading edge 198*b* of the buffer tube 198, which can damage the bare fiber 192.

In an embodiment where the buffer tube is omitted, the furcation tube is inserted into the third bore portion 586 until the leading edge 199*b* of the furcation tube 199 engages or is proximate the stop surface 587. The bare fiber 192 is inserted into the through bore 572 via the opening at the second end 576 of the connector body 550. The tapered bore portion 580 guides the bare fiber 192 into the first bore portion 582, which guides the bare fiber 192 into the second bore portion 584, which guides the bare fiber into the furcation tube 199 in the third bore portion 586. Because the inner diameter of the second bore portion 584 is smaller than an inner diameter of a bore 199*a* of the furcation tube 199, the bare fiber 192 is guided into the furcation tube 199 without fear of engaging the leading edge 199b of the furcation tube 199, which can damage the bare fiber 192.

FIGS. 7-11 illustrate another exemplary breakout 200 according to various aspects of the disclosure. The breakout 200 is configured and dimensioned to break out fiber optic cables 192 from a multi-fiber cable 190 containing a plurality of fiber optic cables. As illustrated, the breakout 200 is configured to break out the individual fibers from a multi-fiber cable containing up to twelve fibers. It should be appreciated that the breakout 200 and its components can be scaled in size and configuration to break out the individual fibers from a multi-fiber cable containing more or less than twelve fibers. The breakout 200 can also be scaled to be compatible with various diameters of multi-fiber cable.

The breakout 200 includes a housing 210, a connector body or cable body portion 230, a coupler or coupler portion 250, and a breakout body or breakout body portion 270. The housing 210 includes a first housing portion 212a and a second housing portion 212b. Each housing portion 212a, 212b extends from a first end surface 214 to a second end surface 216 in a peripheral direction. The first and second end surfaces 214, 216 lie in a same plane. Each housing portion 212a, 212b has a first end 218 and a second end 220 in a longitudinal direction.

A first projection 219 extends from the first end surface 214 proximate the first end 218, and a second projection 221 extends from the first end surface 214 proximate the second end 220. The second end surface 216 includes a cutout 222 between the first and second projections 219, 221 in the longitudinal direction. A free end of the first projection 219 includes a lip 219a that extends toward the second end surface 216, and a free end of the second projection 221 includes a lip 221a that extends toward the second end surface 216.

The second end surface 216 includes a first cutout portion 223 proximate the first end 218 and a second cutout portion 225 proximate the second end 220. The first cutout portion 223 is configured to include a shoulder portion 223a spaced from the second end surface 216, and the second cutout portion 225 is configured to include a shoulder portion 225a spaced from the second end surface 216. A projection 224 extends from the first surface 214 between the first and second cutout portions 223, 225 in the longitudinal direction.

The housing 210 is formed with the first end surface 214 of the first housing portion 212a facing the second end surface 216 of the second housing portion 212b and the first end surface 214 of the second housing portion 212b facing the second end surface 216 of the first housing portion 212a. In this relative orientation, the first cutout portion 223 of the first housing portion 212a is configured to receive the second projection 221 of the second housing portion 212b such that the lip 221a is overlaps and engages the shoulder portion 223a in a snap fit relationship, as would be understood by persons of ordinary skill in the art. Also, the second cutout portion 225 of the first housing portion 212a is configured to receive the first projection 219 of the second housing portion 212b such that the lip 219a overlaps and engages the shoulder portion 225a in a snap fit relationship. In addition, the cutout 222 of the second housing portion 212b is configured to receive the projection 224 of the first housing portion 212a, for example, due to the cutout 222 and the projection 224 having complementary shapes and sizes.

Similarly, in this relative orientation, the first cutout portion 223 of the second housing portion 212b is configured to receive the second projection 221 of the first housing portion 212a such that the lip 221a is overlaps and engages the shoulder portion 223a in a snap fit relationship, as would be understood by persons of ordinary skill in the art. Also, the second cutout portion 225 of the second housing portion 212b is configured to receive the first projection 219 of the first housing portion 212a such that the lip 219a overlaps and engages the shoulder portion 225a in a snap fit relationship. In addition, the cutout 222 of the first housing portion 212a is configured to receive the projection 224 of the second housing portion 212b, for example, due to the cutout 222 and the projection 224 having complementary shapes and sizes.

The radial inner walls 213 of the first housing portion 212a and the second housing portion 212b include a groove portion 226 extending from the first end wall 214 to the second end wall 216. The radial inner walls 213 of the first housing portion 212a and the second housing portion 212b include a first pair of cutouts (not shown), for example, right angle cutouts, extending from the first end surface 214 and a second pair of cutouts 229a, 229b, for example, right angle cutouts, extending from the second end surface 216. The first pair of cutouts are spaced apart from one another in the longitudinal direction, and the second pair of cutouts 229a, 229b are spaced apart from one another in the longitudinal direction. On the first housing portion 212a, the first and second pairs of cutouts 229a, 229b are nearer to the second end 218 than to the first end 220, but on the second housing portion 212b, the first and second pairs of cutouts 229a, 229b are nearer to the first end 218 than to the second end 220.

The connector body 230 includes a forward portion 232, a rearward portion 234, an externally threaded portion 236 between the forward and rearward portions 232, 234. The forward portion 232 is configured to be coupled with the housing 210, and the rearward portion 234 is configured to be coupled with the multi-fiber cable 190.

The forward portion 232 includes a generally cylindrical outer surface 233 a pair of square flanges 238a, 238b extending from the outer surface 233. The square flanges 238a, 238b are sized and arranged such that the square flange 238a is configured to be received by the cutouts 229b of the first and second housing portions 212a, 212b and the square flange 238b is configured to be received by the cutouts 229a of the first and second housing portions 212a, 212b. The cutouts 229a, 229b and the square flanges 238a, 238b cooperate to restrain the connector body 230 from moving rotationally and axially relative to the housing 210.

The rearward portion 234 includes a plurality of fingers or finger portions 240 that extend from a tubular wall 242 of the rearward portion 234 in a rearward direction away from the threaded portions 236. In the illustrated embodiment, the plurality of fingers 240 are defined by V-shaped cutouts 244 at a rearward end of the rearward portion 234 of the connector body 230. Although the illustrated embodiment includes a rearward portion 234 having three fingers 240, it should be understood that in some embodiments the rearward portion 234 may include two fingers or more than three fingers.

Figure 10:
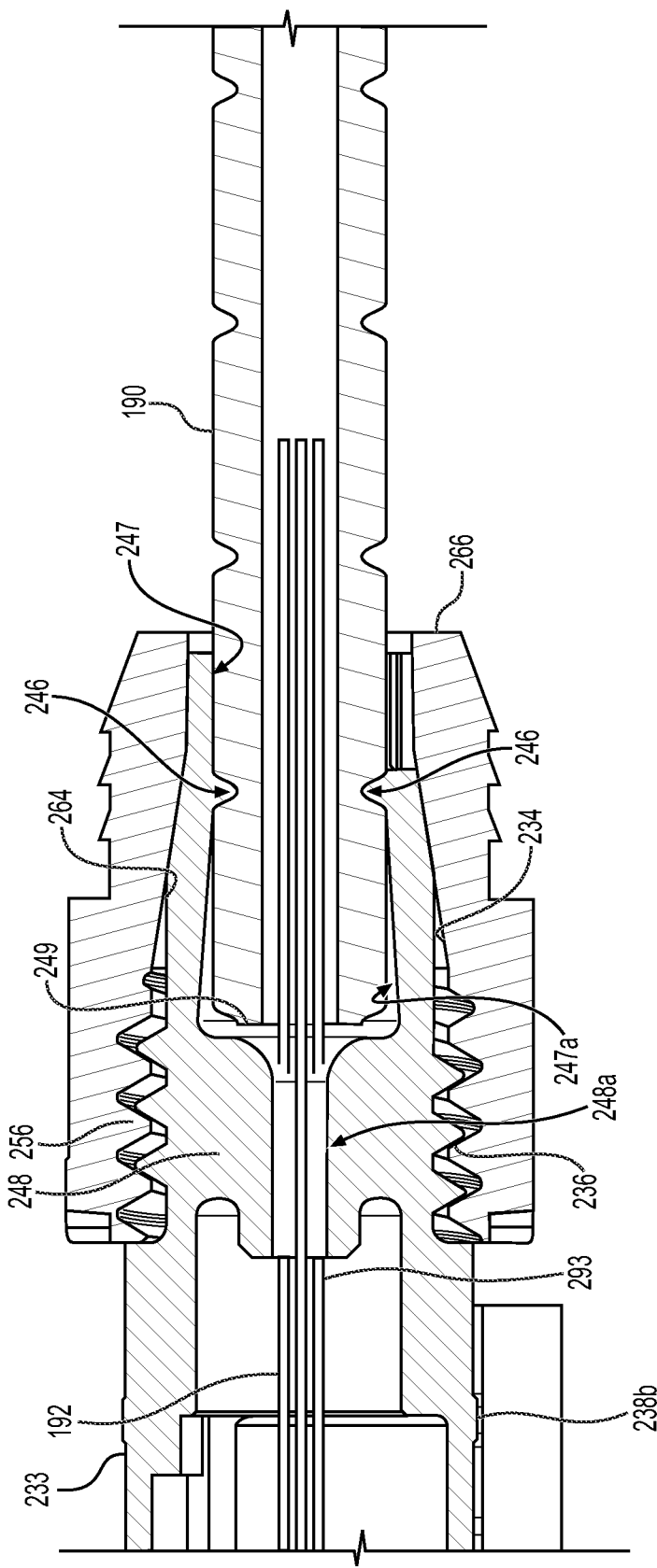
FIG. 10 is a side cross-sectional view of a portion of the exemplary breakout of FIG. 7 coupled with a multi-fiber cable.
Figure 11:
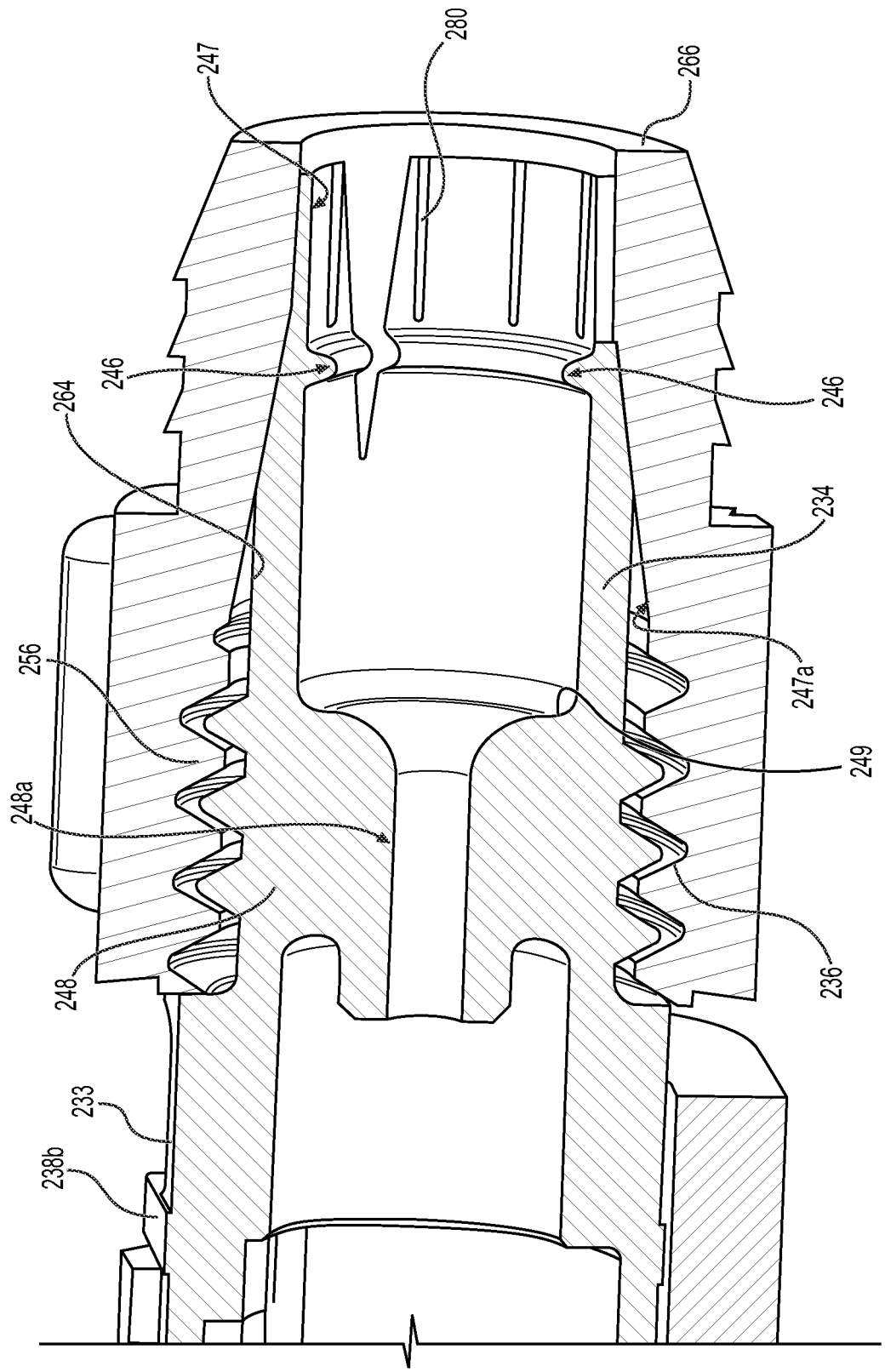
FIG. 11 is an enlarged perspective cross-sectional view of a portion of the exemplary breakout of FIG. 7.

As shown in FIG. 10, an annularly extending ridge or ridge portion 246 protrudes radially inward from an inner surface 247 of the one or more fingers 240. The inner surface 247 defines a first bore 247a having a diameter configured to receive the multi-fiber cable 190. An annular flange 248 extends inward from the inner surface 247 and defines a second bore 248a having a smaller diameter than the first bore 247a. The flange 248 defines a stop surface 249 that limits the distance that the multi-fiber cable 190 can be inserted into the coupler 250 from the rearward portion 234. The second bore 248a is configured to receive a bundle 293 of fibers 192 from the multi-fiber cable 190. A longitudinal projection or ridge portion 280 may extend radially inward from the inner surface of the finger 240 to grip the cable 190 to resist relative rotation between the cable 190 and the cable body portion 270.

The coupler 250 includes a forward portion 252 and a rearward portion 254. The forward portion 252 includes internal threads 256 and an exterior surface that may be configured with a plurality of linear surfaces 258 to facilitate gripping of the coupler 250 for rotation relative to the connector body 230. The rearward portion 254 may include an outer surface 260 having one or more barbs 262 configured to receive and to help retain a boot (not shown), if desired. The internal threads 256 are sized and arranged to be threadedly coupled with the threaded portion 236 of the connector body 230.

The coupler 250 includes a tapered inside diameter portion 264 that tapers radially inward in a rearward direction from the internal threads 256 toward a rear end 266 of the rearward portion 254. As illustrated, the inner diameter of the coupler 250 at the tapered inside diameter portion 264 and extending from the tapered inside diameter portion 264 to the rear end 266 is less than an outer diameter of the fingers 240, such that the coupler 250 is configured to compress the fingers 240 radially inward when the coupler 250 is threadedly coupled with the threaded portion 236 of the connector body 230.

The breakout body 270 includes a plurality of through bores 272 extending from a first end 274 to a second end 276 of the breakout body 270. As illustrated, the breakout body 270 includes twelve through bores, each being configured to receive an individual fiber cable 192 broken out from a twelve fiber multi-fiber cable 190. It should be appreciated that the breakout body 270 can include more or less through bores depending on the number of fiber cables in the multi-fiber cable.

The breakout body 270 includes an outer surface 273 and an annular flange portion 275 at an end of the breakout body portion 270 nearest the cable body portion 230. The groove portion 226 is configured to receive the flange portion to restrain the breakout body 270 from moving rotationally and axially relative to the housing 210.

In use, the coupler 250 is slid over an end of the multi-fiber cable 190, and the multi-fiber cable 190 is inserted into the first bore 247a at the rearward portion 234 of the connector body 220 as far as the stop surface 249 and with the ridge 246 aligned with an annular groove or groove portion 195 in the multi-fiber cable 190. The bundle 193 of fibers 192 extends from the multi-fiber cable 190 and is inserted through the second bore 148a and out of the forward portion 232 of the connector body.

At any time after the fibers 192 are fed through the connector body, the coupler 250 can be threadedly coupled with the connector body 230 via threaded portions 236, 256. When the coupler 250 is threadedly coupled with the threaded portion 236 of the connector body 230, the tapered inner surface 264 of the coupler 250 is configured to compress the fingers 240 radially inward to mechanically couple the coupler 250 with the multi-fiber cable 190. The ridge 246 can be urged into the annular groove 195 in the multi-fiber cable 190 to prevent relative axial movement between the coupler 250 and the multi-fiber cable 190.

The individual fibers 192, for example, bare fibers (i.e., a glass fiber filament coated with a strippable coating, e.g., a 250 μm coating), are inserted into and through the through bores 272 of the breakout body 270 and exit the first end 274 of the breakout body 270. The individual fibers 192 exiting the breakout body 270 can be inserted into furcation tubes (not shown) for protection as the fibers are routed to a desired location and terminated for connection to an optical network.

To couple the housing 210 with the connector body 230 and the breakout body, the cutouts 228b, 229b of the first and second housing portions 212a, 212b are aligned with the square flange 238a, and the cutouts 228a, 229a of the first and second housing portions 212a, 212b are aligned with the square flange 238b. The first, second and third ridges 226a, 226b, 227 of the first and second housing portions 212a, 212b are aligned with the annular grooves 278a, 278b and axial grooves 279, respectively. The projections 219, 221 of the first housing portion 212a are inserted into the cutouts 225, 223 of the second housing portion 212b, respectively, until the lips 219a, 221a snap lock over the respective shoulder portions 225a, 223a, and the projections 219, 221 of the second housing portion 212b are inserted into the cutouts 225, 223 of the first housing portion 212a, respectively, until the lips 219a, 221a snap lock over the respective shoulder portions 225a, 223a.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A breakout assembly that is configured to be tool-lessly coupled with a multi-fiber cable comprising:
   a breakout body portion configured to break out a plurality of fiber cables from a multi-fiber cable;
   a cable body portion having a breakout proximate body end portion that is located proximate to the breakout body portion when the breakout assembly is assembled and a cable engaging body end portion that is configured to engage a multi-fiber cable;
   a coupler portion configured to be coupled with the cable engaging body end portion of the cable body portion;
   a housing configured to be coupled with the breakout body portion and the cable body portion;
   wherein the housing includes a first housing portion and a second housing portion that is configured to be coupled with the first housing portion;
   wherein the housing is configured to be coupled with the cable body portion such that the cable body portion is prevented from rotating and from moving axially relative to the housing;
   wherein the housing is configured to be coupled with the breakout body portion such that the breakout body portion is prevented from rotating and from moving axially relative to the housing;
   wherein the cable body portion is configured to limit a distance that a multi-fiber cable is inserted into the cable engaging body end portion of the cable body portion;
   wherein the coupler portion includes an annularly extending ridge portion that is configured to protrude radially inward from an inner surface portion of the cable body portion;

wherein the annularly extending ridge portion is configured to engage an annular groove portion in a multi-fiber cable when the cable body portion is coupled with the coupler portion so as to prevent relative axial movement between the coupler portion and the multi-fiber cable;

wherein the cable engaging body end portion of the cable body portion includes an external threaded portion and a radially compressible portion that extends from the external threaded portion in a direction away from the breakout proximate body end portion of the cable body portion;

wherein the coupler portion includes an internal threaded coupler portion and a tapered inner coupler surface that extends from the internal threaded coupler portion in a direction away from the cable body portion;

wherein the internal threaded coupler portion of the coupler portion is configured to be threadedly coupled with the external threaded portion of the cable body portion;

wherein the tapered inner surface of the coupler portion is configured to urge the radially compressible portion of the cable body portion radially inward when the coupler portion is threadedly coupled with the cable body portion so as radially compress the radially compressible portion onto a multi-fiber cable; and wherein the coupler portion is configured to be tightened to the cable body portion so as to tool-lessly form a mechanical breakout-cable connection that is configured to allow the breakout assembly to be connected to a multi-fiber cable without having to use a tool.

2. The breakout assembly of claim 1, wherein the first housing portion and the second housing portion are configured to be coupled with one another via a snap fit connection.

3. The breakout assembly of claim 1, wherein the breakout body portion includes a non-circular portion that is configured to be received by the housing so as prevent relative rotation between the breakout body portion and the housing.

4. The breakout assembly of claim 1, wherein the cable body portion includes a non-circular portion that is configured to be received by the housing so as prevent relative rotation between the cable body portion and the housing.

5. The breakout assembly of claim 1, wherein the cable body portion includes an annular flange that is configured to extend inwardly to define a stop surface that is configured to limit the distance that a multi-fiber cable is inserted into the cable engaging body end portion of the body portion.

6. A breakout assembly that is configured to be tool-lessly coupled with a multi-fiber cable comprising:
a breakout body portion configured to break out a plurality of fiber cables from a multi-fiber cable;
a cable body portion having a breakout proximate body end portion proximate the breakout body portion and a cable engaging body end portion that is configured to be engage a multi-fiber cable;
a coupler portion configured to be coupled with the cable engaging body end portion of the cable body portion;
a housing configured to be coupled with the breakout body portion and the cable body portion;
wherein the cable engaging body end portion of the cable body portion includes an external threaded portion and a radially compressible portion that extends from the external threaded portion in a direction away from the breakout proximate body end portion;

wherein the coupler portion includes an internal threaded portion and a tapered inner surface extending from the internal threaded portion in a direction away from the cable body portion;

wherein the internal threaded portion of the coupler portion is configured to be threadedly coupled with the external threaded portion of the cable body portion;

wherein the tapered inner surface of the coupler portion is configured to urge the radially compressible portion of the cable body portion radially inward when the coupler portion is threadedly coupled with the cable body portion so as radially compress the radially compressible portion onto a multi-fiber cable; and wherein the coupler portion is configured to be tightened to the cable body portion so as to tool-lessly provide a mechanical connection between the breakout and a multi-fiber cable.

7. The breakout assembly of claim 6, wherein the coupler portion includes an annularly extending ridge portion that is configured to protrude radially inward from an inner surface portion of the cable body portion, and the annularly extending ridge portion is configured to engage an annular groove portion in a multi-fiber cable when the cable body portion is coupled with the coupler portion so as to prevent relative axial movement between the coupler portion and the multi-fiber cable.

8. The breakout assembly of claim 6, wherein the housing includes a first housing portion and a second housing portion that is configured to be coupled with first housing portion.

9. The breakout assembly of claim 6, wherein the first housing portion and the second housing portion are configured to be coupled with one another via a snap fit connection.

10. The breakout assembly of claim 6, wherein the housing is configured to be coupled with the cable body portion such that the cable body portion is prevented from rotating and from moving axially relative to the housing, and the housing is configured to be coupled with the breakout body portion such that the breakout body portion is prevented from rotating and from moving axially relative to the housing.

11. The breakout assembly of claim 6, wherein the cable body portion is configured to limit a distance that a multi-fiber cable is inserted into the cable engaging body end portion of the cable body portion.

12. The breakout assembly of claim 11, wherein the cable body portion includes an annular flange portion that is configured to extend inwardly to define a stop surface that is configured to limit the distance that a multi-fiber cable is inserted into the cable engaging body end portion of the cable body portion.

13. The breakout assembly of claim 6, wherein the breakout body portion includes a non-circular portion that is configured to be received by the housing so as prevent relative rotation between the breakout body portion and the housing, and the cable body portion includes a non-circular portion that is configured to be received by the housing so as prevent relative rotation between the cable body portion and the housing.

14. A multi-fiber breakout assembly configured to be tool-lessly terminated on a multi-fiber cable comprising:
a breakout body portion that is configured to break out a plurality of fiber cables from a multi-fiber cable;
a body portion that includes a body-to-coupler engaging portion and a radially inward body-to-cable engaging portion that is configured to engage an outwardly facing cable portion of a multi-fiber cable;

a cable body portion having a cable engaging body end portion that is structurally configured to engage the multi-fiber cable;

a coupler portion that includes a coupler-to-body engaging portion that is configured to engage the body-to-coupler engaging portion of the body portion when the connector assembly is terminated on a cable;

wherein the coupler portion is configured to move from a first position, where the coupler portion does not urge the radially inward body-to-cable engaging portion radially inward onto the outwardly facing cable portion of the multi-fiber cable, to a second position, where the coupler portion urges the radially body-to-cable engaging portion radially inward onto the outwardly facing cable portion of the cable so as to form a body-to-cable engagement portion when the coupler portion is in the second position;

wherein the cable body portion includes an engagement portion structurally configured to engage a receiving portion of the body portion to restrain the cable body portion from rotational and axial movement in the body portion;

wherein the body portion includes a breakout proximate body end portion that is located proximate to the breakout body portion when the coupler portion is in the second position; and wherein the coupler portion is configured to provide a mechanical connector assembly-to-cable connection that is configured to allow the connector to be connected to the cable without having to use a tool.

15. The multi-fiber breakout assembly of claim 14, wherein the portion of the cable body portion comprises a radially compressible portion at the cable engaging body end portion of the cable body portion, and the coupler portion includes an inner surface that tapers in a direction away from the cable body portion.

16. The multi-fiber breakout assembly of claim 14, wherein the second end of the cable body portion includes an external threaded portion, and the coupler portion includes an internal threaded portion configured to be threadedly coupled with the external threaded portion of the cable body portion.

17. The multi-fiber breakout assembly of claim 14, wherein the coupler portion includes an annularly extending ridge portion that is configured to protrude radially inward from an inner surface portion of the cable body portion, and the annularly extending ridge portion is configured to engage an annular groove portion in a multi-fiber cable when the cable body portion is coupled with the coupler portion so as to prevent relative axial movement between the coupler portion and the multi-fiber cable.

18. The multi-fiber breakout assembly of claim 14, further comprising a housing that is configured to be coupled with the breakout body portion and the cable body portion.

19. The multi-fiber breakout assembly of claim 18, wherein the housing includes a first housing portion and a second housing portion configured to be coupled with one another.

20. The multi-fiber breakout assembly of claim 19, wherein the first housing portion and the second housing portion are configured to be coupled with one another via a snap fit connection.

21. The multi-fiber breakout assembly of claim 18, wherein the housing is configured to be coupled with the cable body portion such that the cable body portion is prevented from rotating and from moving axially relative to the housing.

22. The multi-fiber breakout assembly of claim 18, wherein the housing is configured to be coupled with the breakout body portion such that the breakout body portion is prevented from rotating and from moving axially relative to the housing.

23. The multi-fiber breakout assembly of claim 14, wherein the cable body portion is configured to limit a distance that a multi-fiber cable is inserted into the cable engaging body end portion of the body portion.

24. The multi-fiber breakout assembly of claim 23, wherein the cable body portion includes an annular flange that is configured to extend inwardly to define a stop surface that is configured to limit the distance that a multi-fiber cable is inserted into the cable engaging body end portion of the body portion.

25. The multi-fiber breakout assembly of claim 14, wherein the breakout body portion includes a non-circular portion that is configured to be received by the housing so as prevent relative rotation between the breakout body portion and the housing.

26. The multi-fiber breakout assembly of claim 14, wherein the cable body portion includes a non-circular portion that is configured to be received by the housing so as prevent relative rotation between the cable body portion and the housing.

* * * * *